US012725814B2

(12) United States Patent
Wang

(10) Patent No.: US 12,725,814 B2
(45) Date of Patent: Sep. 1, 2026

(54) HYDROGEN FUEL CELL EXHAUST SYSTEM

(71) Applicant: HYTECH POWER, INC., City of Industry, CA (US)

(72) Inventor: Zhengquan Wang, City of Industry, CA (US)

(73) Assignee: HYTECH POWER INC., City of Industry, CA (US)

( * ) Notice: Subject to any disclaimer, the term of this patent is extended or adjusted under 35 U.S.C. 154(b) by 609 days.

(21) Appl. No.: 17/403,427

(22) Filed: Aug. 16, 2021

(65) Prior Publication Data

US 2023/0047889 A1 Feb. 16, 2023

(51) Int. Cl.

*H01M 8/04119* (2016.01)
*H01M 8/04089* (2016.01)
*H01M 8/0432* (2016.01)

(52) U.S. Cl.

CPC ... *H01M 8/04164* (2013.01); *H01M 8/04104* (2013.01); *H01M 8/04365* (2013.01)

(58) Field of Classification Search

CPC ......... H01M 8/04164; H01M 8/04365; H01M 8/0662; H01M 50/35; H01M 8/04156; H01M 8/04761; B01D 46/0004; B01D 46/0005; B01D 5/00; B01D 46/0039; B01D 5/003; B01D 5/009; B01D 53/002; B01D 35/00

See application file for complete search history.

(56) References Cited

U.S. PATENT DOCUMENTS 3,905,385 A * 9/1975 Green ........................ F16T 1/00 137/392
4,343,770 A * 8/1982 Simons ................. F17C 11/005 422/223
4,800,138 A * 1/1989 Romanowski ......... B64G 1/423 494/35
6,279,593 B1 * 8/2001 Sheppard .................. F16T 1/00 137/181
7,514,165 B2 4/2009 Walsh
8,273,164 B2 9/2012 Makino et al.
8,481,218 B2 7/2013 Kwon et al.
2002/0110712 A1 * 8/2002 Struthers ............. H01M 8/0612 429/423

(Continued)

FOREIGN PATENT DOCUMENTS

CN 113178601 A * 7/2021 ........ H01M 8/04164
JP 2006049100 A * 2/2006

(Continued)

*Primary Examiner* — Imran Akram

(74) *Attorney, Agent, or Firm* — Che-Yang Chen; Law Office of Michael Chen

(57) ABSTRACT

The present invention is a hydrogen exhaust device for fuel cell. A tail gas discharge device for a fuel cell system includes a steam trap, a buffer solenoid valve, a buffer tank and a drain solenoid valve. The steam trap can collect water from wet hydrogen. The buffer tank is a hollow cavity structure such as a tank. Preferably, the steam trap has an upper cover, a main body, a lower cover and a filter. The upper cover has a wet hydrogen inlet, a pressure sensor, a dry hydrogen outlet and a temperature sensor. The lower cover has a liquid storage cavity and a filter support part. The filter has a filter filler and a filter intake channel.

16 Claims, 5 Drawing Sheets

(56) References Cited

U.S. PATENT DOCUMENTS

2003/0198840 A1* 10/2003 Walsh ............... H01M 8/04231 429/444
2003/0230196 A1* 12/2003 Kim ....................... B01D 53/22 96/417
2007/0039815 A1* 2/2007 Bartel ....................... C25B 5/00 204/242
2009/0023042 A1* 1/2009 Kweon ............. H01M 8/04097 429/413
2009/0162730 A1* 6/2009 Ohira ................ H01M 8/04253 429/410
2009/0304558 A1* 12/2009 Patton ..................... C01B 3/065 422/600
2010/0051508 A1 3/2010 Seon-heum
2010/0193047 A1* 8/2010 Gooding ................... F16T 1/45 137/395
2010/0297513 A1* 11/2010 Yasuda ............. H01M 8/04164 429/423
2011/0048837 A1* 3/2011 Kwon ............... H01M 8/04805 429/456
2011/0294023 A1* 12/2011 Yang ................. H01M 8/04753 429/410
2012/0237843 A1* 9/2012 Paganelli ................ C25B 15/02 429/444
2013/0026033 A1* 1/2013 Ji ............................. C02F 9/20 204/276
2013/0071763 A1* 3/2013 Betts .................. H01M 8/0668 429/411
2013/0094842 A1* 4/2013 Ohtsuka ............ H01M 8/04014 137/561 A
2014/0220462 A1* 8/2014 Takeda ................ B01D 53/268 96/11
2014/0363370 A1* 12/2014 Ishikawa .................. C01B 3/10 423/657
2016/0377342 A1* 12/2016 Mermelstein ..... H01M 8/04179 62/617
2017/0084937 A1* 3/2017 Shim ................ H01M 8/04589
2017/0294665 A1* 10/2017 Ok .................... H01M 8/04089
2019/0016233 A1* 1/2019 Jeon .................. H01M 8/04228
2019/0157695 A1* 5/2019 Okamura .......... H01M 8/04731
2021/0091390 A1* 3/2021 Meder ............... H01M 8/04164
2021/0179451 A1* 6/2021 Ballantine ........... C01B 13/0207
2022/0131214 A1* 4/2022 Wankewycz ...... H01M 8/04037
2022/0311035 A1* 9/2022 Tagami .................. B01D 53/26
2023/0062648 A1* 3/2023 Arevalo ................ C25B 15/081

FOREIGN PATENT DOCUMENTS

KR 20200092353 A * 8/2020
WO WO-2020159443 A1 * 8/2020 .......... H01M 16/003
WO WO-2020189969 A1 * 9/2020 ............. F01D 15/10
WO WO-2021151611 A1 * 8/2021

* cited by examiner

HYDROGEN FUEL CELL EXHAUST SYSTEM

FIELD OF THE INVENTION

The present invention is in the field of hydrogen fuel cell exhaust systems.

DISCUSSION OF RELATED ART

One of the most important recent developments in sustainable energy vehicle design is fuel-cell vehicles. A variety of different operating conditions such as hydrothermal management, hydrogen pressure fluctuation, metering ratio, drainage and exhaust are important factors that affect the performance and reliability of the fuel cell system. Presently, the main method to solve the problem of drainage and exhaust on the hydrogen side and the metering ratio is by increasing the hydrogen side circulation and adding a hydrophobic device on the circulation side. Also, adding a valve at the hydrogen outlet allows exhaust of hydrogen directly to the atmosphere, however this intermittent opening of a hydrogen outlet creates pressure fluctuations when the drainage and exhaust valves are opened, especially under-power and high-pressure operations. This affects the electrical performance and reliability of the fuel-cell system. The current state of the hydrophobic device design is inefficient. For fuel-cell systems with different power levels, the filters often need to be recalibrated. Therefore, an efficient hydrogen exhaust device is needed for optimizing fuel-cell operation.

SUMMARY OF THE INVENTION

It is an object of the present invention to provide a hydrogen exhaust device that buffers both drainage and exhaust, reduces the impact of system pressure fluctuations on the hydrogen side, and increases electrical performance and system reliability while providing an improved integration and expansion performance for use on a fuel-cell system that has multiple power levels.

The present invention is a hydrogen exhaust device for fuel cell. A tail gas discharge device for a fuel cell system includes a steam trap, a buffer solenoid valve, a buffer tank and a drain solenoid valve. The steam trap can collect water from wet hydrogen. The buffer tank is a hollow cavity structure such as a tank.

Preferably, the steam trap has an upper cover, a main body, a lower cover and a filter. The upper cover has a wet hydrogen inlet, a pressure sensor, a dry hydrogen outlet and a temperature sensor. The lower cover has a liquid storage cavity and a filter support part. The filter has a filter filler and a filter intake channel.

Preferably, the wet hydrogen inlet communicates with the filter air inlet channel. The shape of the filter conforms to the steam trap housing and is mounted inside the steam trap housing. The filter forms a gas-liquid separation channel with the steam trap main body. The filter has a dry air channel that communicates to the upper cover of the steam trap. The filter forms a liquid channel with the filter support part of the lower cover of the steam trap. The upper part of the gas-liquid separation channel communicates with the dry hydrogen outlet through the dry gas channel. An electronic control system controls the buffer solenoid valve and the drain solenoid valve. The electronic control system controls flow from the liquid storage cavity through the tail gas outlet, controls the buffer solenoid valve for flow to the buffer tank, and controls the drain solenoid valve for flow out of the buffer tank.

Preferably, a liquid level sensor is arranged inside the liquid storage cavity, which can detect the liquid storage height in real time. The buffer tank and steam trap body are preferably cylindrical, rectangular or conical.

Preferably, the width of the gas-liquid separation channel is 3-10 mm, and the depth of the liquid storage chamber is 10-50 mm. In any particular design, it can be matched according to the fuel cell stack power and the discharge cycle calculation period.

Preferably, the materials of the filler include metal filler, plastic filler and ceramic filler. The forms of the fillers include filamentous fillers, mesh fillers, laminated fillers and granular fillers. The pressure sensor can be integrated into the buffer tank. The ceramic filler can be a porous ceramic honeycomb commonly used for catalytic conversion of combustible exhaust for example, and the metal filler can be a series of nested metal mesh cups that the wet hydrogen passes through. A honeycomb structure may have elongated honeycomb channels that are internally disposed within a ceramic structure.

Preferably, the buffer solenoid valve and the drain solenoid valve are controlled synchronously or asynchronously with an electronic control system. The electronic control system can first open the buffer solenoid valve, and then after the buffer tank pressure is balanced with the pressure of the liquid storage chamber or the interval of 0.5-10 seconds, the buffer solenoid valve is closed and then the discharge solenoid valve is opened. When asynchronously controlled a delay can be introduced so that after an interval of 0.5-10 seconds or when the buffer tank pressure is consistent with the external pressure, the drain solenoid valve is closed to achieve asynchronous drainage. The electronic control system can select between synchronous and asynchronous drainage depending upon the flow of wet hydrogen.

A fuel cell system thus may include this hydrogen exhaust device.

The following callout list of elements can be a useful guide in referencing the element numbers of the figures.

1 Steam Trap
2 Buffer Solenoid Valve
3 Buffer Tank
4 Drain Solenoid Valve
5 Upper Cover Of Steam Trap
6 Main Body Of Steam Trap
7 Lower Cover Of Steam Trap
8 Wet Hydrogen Inlet
9 Pressure Sensor
10 Dry Hydrogen Outlet
11 Temperature Sensor
12 Tail Gas Outlet
13 Filter
14 Filter Packing
15 Air Inlet Channel Of Filter 16 Gas-Liquid Separation Channel
17 Dry Gas Channel
18 Liquid Channel
19 Liquid Storage Chamber
20 Filter Support
21 Liquid Level Sensor
22 Lower Flange
23 Lower Outlet Nipple
24 Upper Flange
26 Lower Flange Connector
27 Upper Flange Connector
28 Upper Flange Connector Indent
29 Lower Flange Connector Indent
31 Buffer Solenoid Upper Housing
32 Buffer Solenoid More Housing
33 Buffer Solenoid Valve Intake Connection
34 Buffer Solenoid Valve Outlet Connection
41 Buffer Tank Upper Inlet
42 Buffer Tank Lower Outlet
43 Buffer Tank Outlet
51 Drain Solenoid Valve Upper Housing
52 Drain Solenoid Lower Housing
53 Drain Solenoid Valve Intake Connection
54 Drain Solenoid Valve Outlet Connection
61 Wet Hydrogen Flow
62 Drying Hydrogen Flow
63 Dry Hydrogen
64 Drip
65 Liquid
88 Electronic Control System

DETAILED DESCRIPTION OF THE PREFERRED EMBODIMENT

Figure 1:
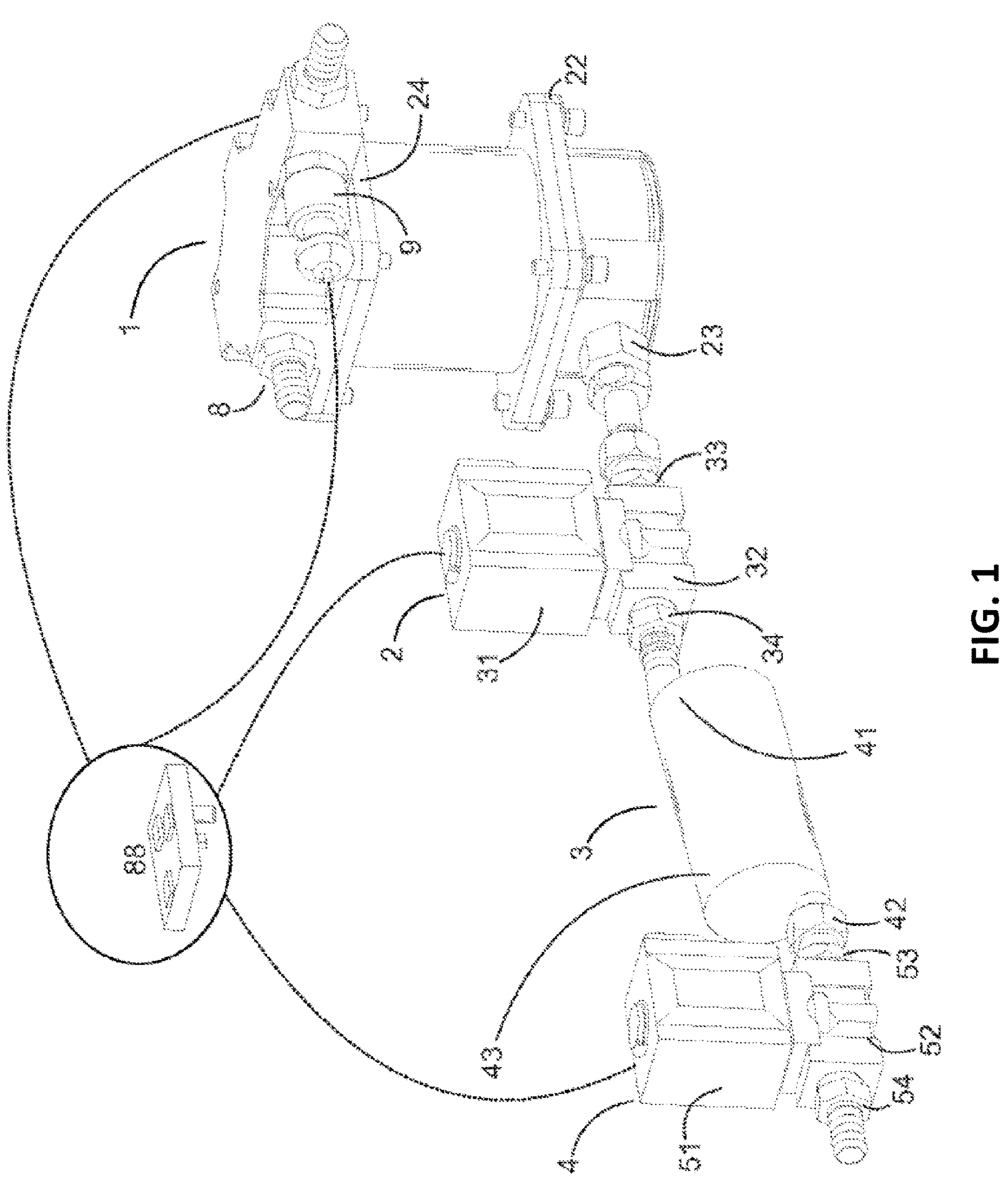
FIG. 1 is the diagram of the sole embodiment of the present invention.
Figure 2:
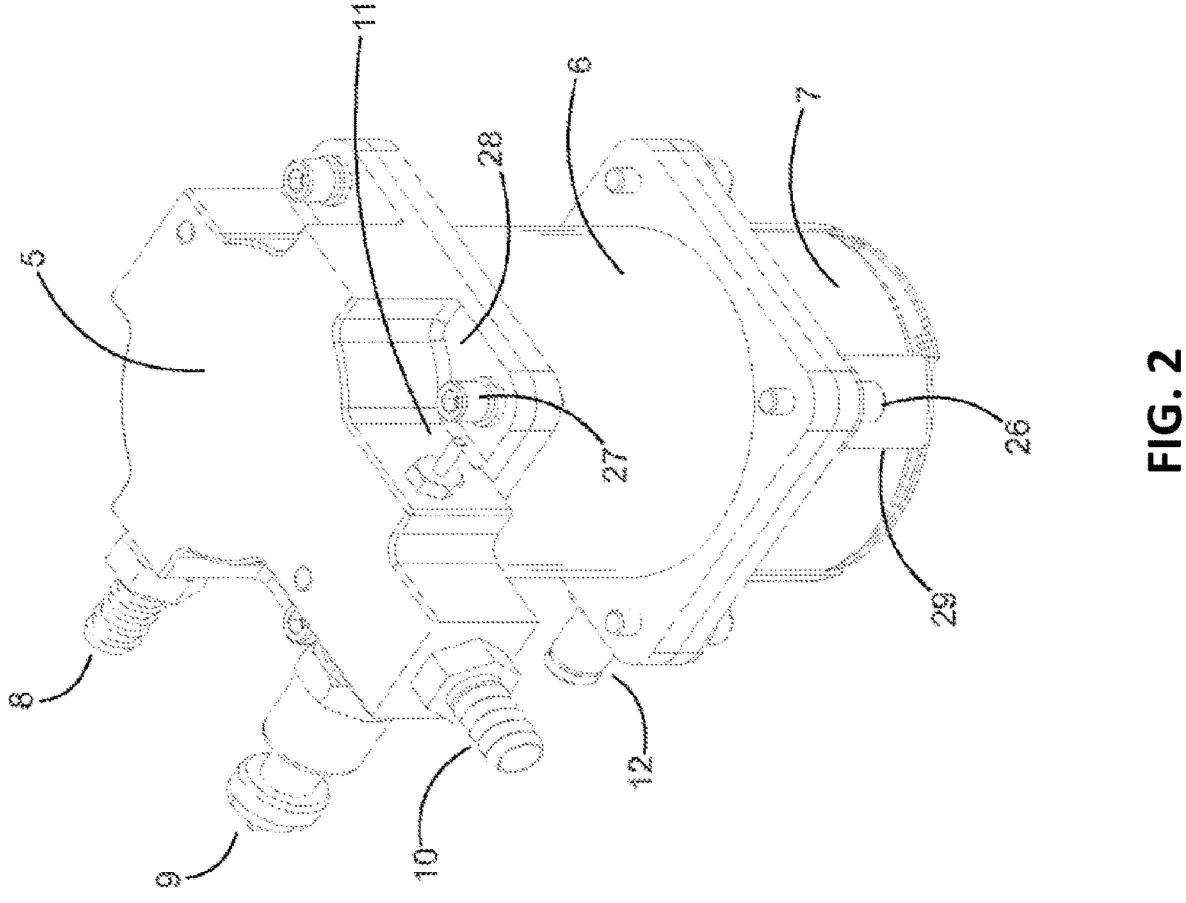
FIG. 2 is the outline structure diagram of the steam trap.

As seen in FIGS. 1-2, the steam trap 1 has a housing formed as a three-part body. An upper flange 24 connects the steam trap upper cover 5 to a steam trap main body 6. The steam trap 1 also has a lower flange 22 that connects a steam trap main body 6 to a steam trap lower cover 7. The upper flange is formed between the steam trap upper cover at a steam trap upper cover flange and a steam trap main body upper flange that meet together to form the upper flange. The upper flange has one or more upper flange connectors 27 recessed in upper flange connector indents 28. Similarly, the steam trap lower cover 7 has a steam trap lower cover flange that meets with the steam trap main body lower flange to form the lower flange. Similarly, the lower flange connector 26 is mounted in a lower flange connector indent 29 formed on a steam trap lower cover 7. The tail gas outlet 12 is mounted on the steam trap lower cover 7. The wet hydrogen inlet 8 and dry hydrogen outlet 10 are mounted to the steam trap upper cover 5. The pressure sensor 9 and the temperature sensor 11 are also mounted to the steam trap upper cover 5.

The tail gas outlet 12 extends from a lower portion of the steam trap lower cover 7 and has a lower outlet nipple 23 that connects to a buffer solenoid valve intake connection 33. The buffer solenoid valve 2 has a buffer solenoid upper housing 31 and a buffer solenoid lower housing 32. The buffer solenoid lower housing contains the mechanical valve of the buffer solenoid valve, and the buffer solenoid upper housing 31 contains the solenoid coil and solenoid for actuating the mechanical valve of the buffer solenoid valve. The buffer solenoid lower housing 32 has a buffer solenoid valve intake connection 33 in communication with the buffer solenoid valve outlet connection 34 when the buffer solenoid valve 2 is in the disengaged position. When the buffer solenoid valve 2 is in the engaged position, the buffer solenoid valve intake connection 33 is stopped which retains fluid in the water reservoir of the steam trap lower cover 7.

The buffer solenoid valve outlet connection 34 connects to the buffer tank upper inlet 41 of the buffer tank 3. The buffer tank 3 also has a buffer tank outlet 43 and the buffer tank outlet 43 has a buffer tank a lower outlet 42 which connects to the drain solenoid valve 4 at a drain solenoid valve intake connection 53. The drain solenoid valve 4 has a drain solenoid valve upper housing 51 and a drain solenoid lower housing 52. The drain solenoid lower housing 52 contains a drain solenoid warehousing mechanical valve that allows fluid communication between the drain solenoid valve intake connection 53 and the drain solenoid valve outlet connection 54 when the drain solenoid valve 4 is in disengaged position. When the drain solenoid valve 4 is in an engaged position, the drain solenoid valve intake connection 53 is stopped which retains fluid in the buffer tank 3. The drain solenoid valve upper housing 51 contains the solenoid and solenoid coil of the drain solenoid valve 4 with the solenoid mechanically engaged to control the mechanical valve of the drain solenoid.

Figure 3:
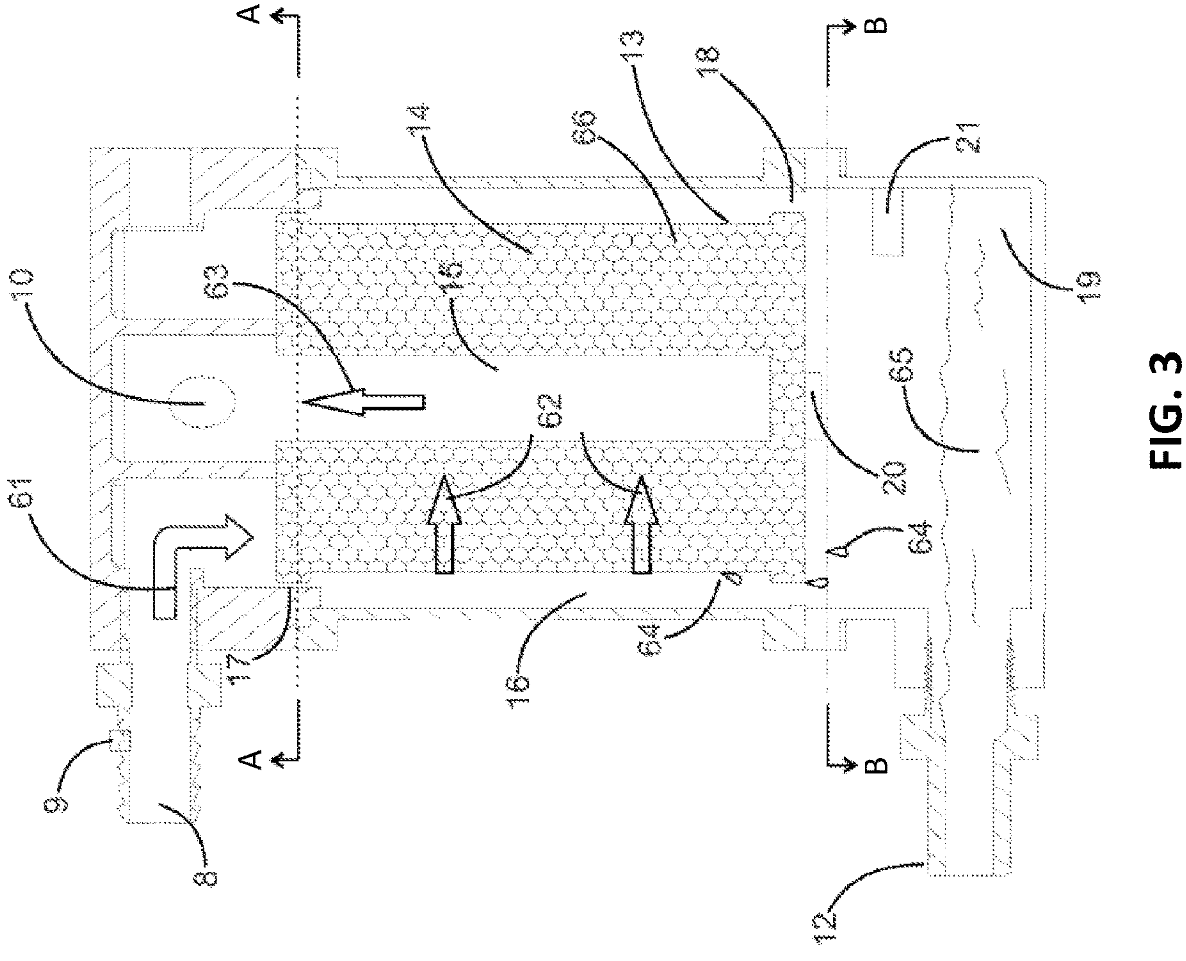
FIG. 3 is the diagram of the internal structure of the steam trap.

As seen in FIG. 3, the pressure sensor 9 is mounted near the wet hydrogen inlet 8 so that the pressure sensor 9 can sense the intake pressure. The temperature sensor 11 is mounted near the dry hydrogen outlet 10 which provides a temperature reading of the dry hydrogen 63 exiting the exhaust system. The dry hydrogen 63 can exit the dry hydrogen outlet 10 and recycled as additional fuel. The wet hydrogen 61 entering the wet hydrogen inlet 8 enters a dry gas channel 17 and a gas-liquid separation channel 16. The flow of wet hydrogen passes through the filter packing 14 of the filter 13 and a liquid channel 18 formed at a lower portion of the filter 13 allows drip 64 of water condensed on the possibly honeycomb structure 66 of the filter packing 14 to jet down to a liquid storage chamber 19 where a pool of liquid 65 accumulates. When the pool of liquid 65 accumulates to reach a level of the liquid level sensor 21, the electronic control system 88 is configured to flush the liquid 65 out through the tail gas outlet 12 by opening the buffer solenoid valve 2. The flushed liquid that enters the buffer tank 3 awaits drainage through the drain solenoid valve 4.

As the wet hydrogen 61 passes through the filter 13, the wet hydrogen 61 becomes drying hydrogen 62 which is in the process of drying as the steam or water exits the hydrogen and is no longer entrained within the hydrogen. The drying hydrogen 62 becomes a flow of dry hydrogen 63 which exits the dry hydrogen outlet 10. The temperature sensor 11 takes the temperature of the dry hydrogen 63 when the dry hydrogen 63 is exiting the dry hydrogen outlet 10 at the steam trap upper cover. The filter 16 is held by a filter support 20 and a filter air inlet channel 15 formed axially through the filter 13 provides an air channel to collect the dry hydrogen 63.

Thus, the steam trap collects liquid and the combination of the buffer solenoid valve and the drain solenoid valve provides a controlled and staged release of fluid from the steam trap lower cover 7. The pressure within the steam trap 1 is greater than the pressure of the buffer tank 3 so that the expulsion from the buffer tank 3 can be performed using the pressure of the steam trap 1.

Figure 4:
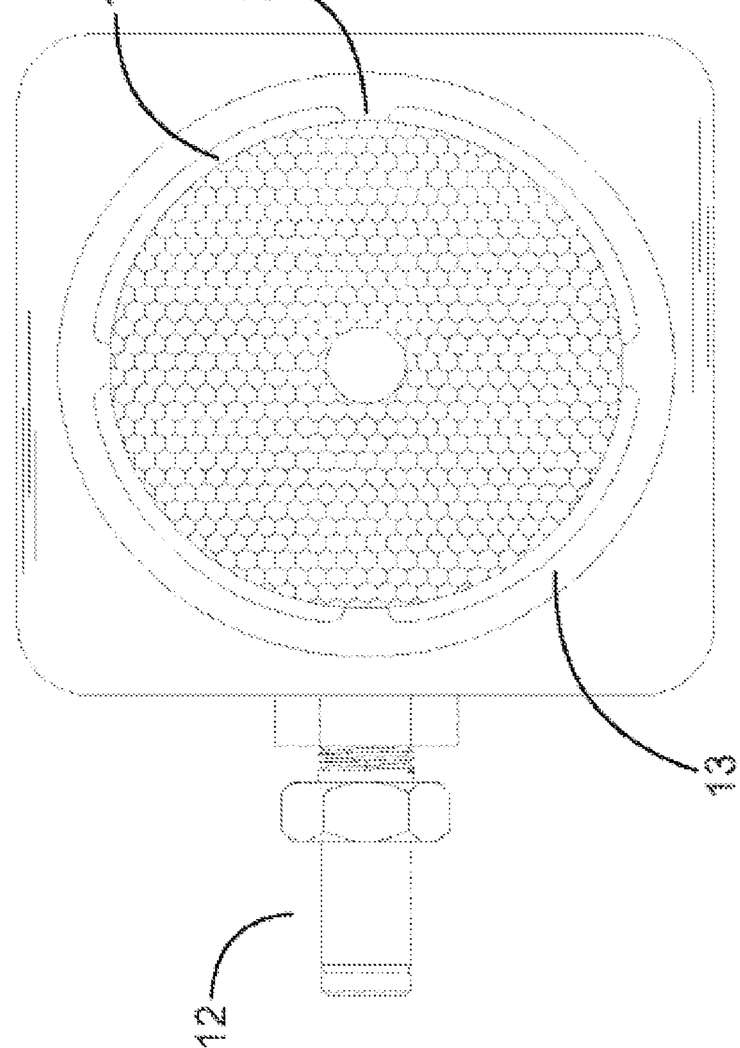
FIG. 4 is the diagram of the bottom shell of the steam trap.
Figure 5:
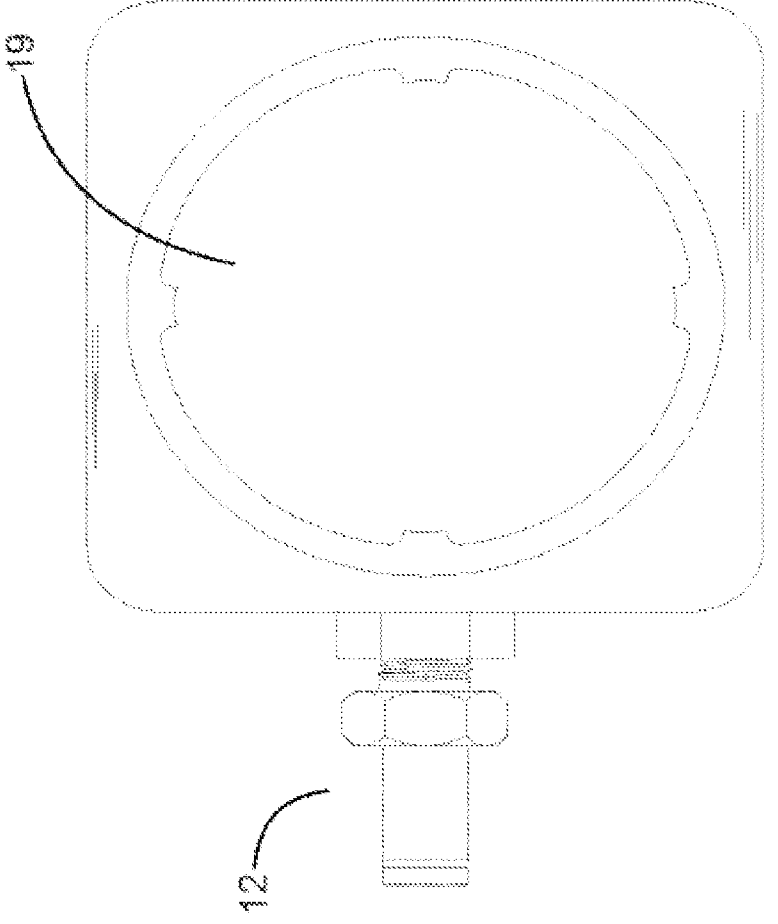
FIG. 5 is the structure diagram of the filter support part.

As seen in FIGS. 4-5, the trail gas outlet 12 extends laterally away from the filter 13. The filter support 20 can be a bracket that circumscribes the filter 13 and holds it as a cage support structure. The filter support may have liquid channels 18 for allowing drainage of water along the sides of the filter 13. The filter 13 may have a cylindrical shape with a rounded sidewall allowing dripping water to flow downwardly by gravity to the liquid storage chamber 19.

In a timed mode of the hydrogen exhaust device for a fuel cell and a fuel cell system employing the device, the system power can be at 80 kw. The main body of the steam trap and buffer tank of the device can be cylindrical. The width of the gas-liquid separation channel is 4 mm, and the depth of the liquid storage chamber is 15 mm. The material of the filter filler includes the metal filler, and the form of filler includes filamentous filler. The liquid level sensor is not seated in the liquid storage chamber of the steam trap, or not connected to the electronic control unit. A pressure sensor is not integrated in the buffer tank, or not connected to the electronic control unit. The buffer solenoid valve and the drain solenoid valve are asynchronously controlled at a 2-second interval during operation. The electronic control unit first opens the buffer solenoid valve, then closes the buffer solenoid valve after 2 seconds, then opens the drain solenoid valve. Afterwards, the electronic control unit closes the drain solenoid valve after 2 seconds and opens the buffer solenoid valve to achieve asynchronous draining.

In an automatic mode the liquid level sensor of the liquid storage cavity and the pressure sensor of the buffer tank are added or connected to the electronic control unit. Automatic drainage by pressure balance is adopted during operation, such that whenever the liquid level sensor reaches the drain position, the electronic control unit is configured to first open the buffer solenoid valve. After the pressure of the buffer tank is balanced with the pressure of the liquid storage chamber, the buffer solenoid valve is closed, and then the drainage solenoid valve is opened. After the buffer tank pressure equalizes relative to external pressure, the discharge solenoid valve is closed to realize automatic asynchronous discharge.

The following advantages of the present invention include the following:

(1) The anode side of a fuel-cell system generates a flow of wet hydrogen gas which can be collected and then received in a buffer tank. The water and waste gas in the buffer tank are discharged to the outside through a drain solenoid valve. The buffering of the buffer tank reduces the pressure fluctuation during direct discharge, which is conducive to improving the operating stability of the system and prolonging the service life of the fuel cell system.

(2) The exhaust system integrates drainage, exhaust, temperature, pressure and liquid volume collection by steam trap, which reduces the complexity of a fuel cell system design.

(3) The filter conforms to the steam trap housing, and the gas-liquid separation channel is formed with the main body of the steam trap housing. The filter forms a dry gas channel with the upper cover of the steam trap, and forms a liquid channel with the filter support part of the lower cover of the steam trap. Each channel is formed through the coupling of components, which does not need additional which improves construction simplicity.

(4) The exhaust system can operate in synchronous or asynchronous mode through the buffer solenoid valve, drain solenoid valve. At the same time, the liquid level sensor allows automatic liquid discharge to ensure smooth system operation.

(5) The modular design of the steam trap housing allows different sized upper covers and lower covers to work with the same steam trap main body to allow modular modification when sizing to different fuel cell systems or operating conditions.

The sole embodiment of the present invention as described in the specification also encompasses the best mode of the present invention.

The invention claimed is:

1. A hydrogen fuel cell exhaust system comprising:

a. a steam trap, wherein the steam trap is configured to collect water from a flow of wet hydrogen, wherein the steam trap includes a steam trap housing, an upper cover, a main body, a lower cover and a filter;

b. a tail gas outlet formed on the steam trap;

c. a buffer solenoid valve connected to the tail gas outlet;

d. a buffer tank connected to the buffer solenoid, wherein the buffer tank has a hollow cavity structure; and e. a drain solenoid valve connected to the buffer tank, wherein the upper cover has a wet hydrogen inlet and a pressure sensor at the wet hydrogen inlet, and the upper cover also has a dry hydrogen outlet and a temperature sensor at the dry hydrogen outlet; and the lower cover has a liquid storage cavity and a filter support part, a filter filler and a filter intake channel; and said wet hydrogen inlet communicates with a filter air inlet channel.

2. The hydrogen fuel cell exhaust system of claim 1, wherein a filter shape conforms to the steam trap housing and is mounted inside the steam trap housing, and wherein the filter forms a gas-liquid separation channel with the main body of the steam trap and wherein the filter has a dry air channel that communicates to the upper cover of the steam trap.

3. The hydrogen fuel cell exhaust system of claim 1, wherein the filter forms a liquid channel with a filter support part mounted in the lower cover of the steam trap.

4. The hydrogen fuel cell exhaust system of claim 1, wherein the upper part of the gas-liquid separation channel communicates with the dry hydrogen outlet through the dry gas channel.

5. The hydrogen fuel cell exhaust system of claim 1, wherein the lower part of the gas-liquid separation channel communicates with the liquid storage cavity through the liquid channel.

6. The hydrogen fuel cell exhaust system of claim 1, wherein the lower cover has a liquid storage cavity and a filter support part, a filter filler and a filter intake channel, wherein a filter shape conforms to the steam trap housing and is mounted inside the steam trap housing, wherein the filter forms a gas-liquid separation channel with the main body of the steam trap, wherein the filter has a dry air channel that communicates to the upper cover of the steam trap, wherein the filter forms a liquid channel with a filter support part mounted in the lower cover of the steam trap, wherein the upper part of the gas-liquid separation channel communicates with the dry hydrogen outlet through the dry gas channel, wherein the lower part of the gas-liquid separation channel communicates with the liquid storage cavity through the liquid channel.

7. The hydrogen fuel cell exhaust system of claim 6, further comprising a liquid level sensor arranged inside the liquid storage cavity, wherein the liquid level sensor is configured to detect the liquid storage height in real time.

8. The hydrogen fuel cell exhaust system of claim 6, wherein a width of the gas-liquid separation channel is 3-10 mm, and a depth of the liquid storage chamber is 10-50 mm.

9. The hydrogen fuel cell exhaust system of claim 6, wherein the materials of the filler are selected from the group of a metal filler, plastic filler and ceramic filler.

10. The hydrogen fuel cell exhaust system of claim 6, wherein a form of the fillers is selected from the group of filamentous fillers, mesh fillers, laminated fillers and granular fillers.

11. The hydrogen fuel cell exhaust system of claim 6, wherein the pressure sensor is integrated into the buffer tank.

12. The hydrogen fuel cell exhaust system of claim 6, wherein the is a porous ceramic honeycomb.

13. The hydrogen fuel cell exhaust system of claim 6, further including an electronic control system that controls the buffer solenoid valve and the drain solenoid valve, wherein the electronic control system controls flow from the liquid storage cavity through the tail gas outlet, controls the buffer solenoid valve for flow to the buffer tank, and controls the drain solenoid valve for flow out of the buffer tank.

14. The hydrogen fuel cell exhaust system of claim 13, wherein the electronic control system controls the buffer solenoid valve and the drain solenoid valve in a synchronous mode and an asynchronous mode, wherein the electronic control system can select between the asynchronous mode and the synchronous mode.

15. The hydrogen fuel cell exhaust system of claim 13, wherein the electronic control system has an asynchronous mode that first opens the buffer solenoid valve, and then after a buffer tank pressure is balanced with the pressure of the liquid storage chamber or a time interval of 0.5-10 seconds elapses, then the buffer solenoid valve is closed and then the discharge solenoid valve is opened, wherein a delay is introduced so that after an interval of 0.5-10 seconds or when the buffer tank pressure is consistent with the external pressure, the drain solenoid valve is closed to achieve asynchronous drainage.

16. The hydrogen fuel cell exhaust system of claim 13, wherein the electronic control system is configured to automatically select between a synchronous mode and an asynchronous mode depending upon a flow of wet hydrogen as measured by a pressure sensor mounted near the flow of wet hydrogen at a wet hydrogen intake of the steam trap.

* * * * *